United States Patent [19]
Wössner

[11] 3,865,356
[45] Feb. 11, 1975

[54] HYDRAULIC SHOCK ABSORBER

[75] Inventor: Felix Wössner, Schweinfurt am Main, Germany

[73] Assignee: Fichtel & Sachs AG, Schweinfurt am Main, Germany

[22] Filed: June 14, 1973

[21] Appl. No.: 370,043

[30] Foreign Application Priority Data
June 20, 1972 Germany............................ 2229945

[52] U.S. Cl............. 267/139, 267/65 R, 267/64 R, 188/317
[51] Int. Cl................................................ F16f 5/00
[58] Field of Search .............. 267/64, 139, 116, 65; 293/70, 85, 86; 188/317, 296

[56] References Cited
UNITED STATES PATENTS

| | | | |
|---|---|---|---|
| 2,724,615 | 2/1971 | Stormer............................. | 188/317 |
| 2,977,146 | 3/1961 | Edwards et al..................... | 267/139 |
| 3,019,009 | 1/1962 | Reifurth............................. | 267/64 |

Primary Examiner—James B. Marbert
Attorney, Agent, or Firm—Hans Berman

[57] ABSTRACT

A hydraulic shock absorber for use between a bumper and frame of an automotive vehicle has a cylinder, a piston formed with throttling passages closed by a spring-loaded valve until an applied axial force reaches a predetermined value, and the opened valve permits liquid flow through the piston, and a chamber filled with gas under pressure and separated from the liquid by an axially movable partition. The gas pressure tends to drive the piston rod outward of the cylinder cavity, but cannot normally exert a force equal to the valve-opening force. The characteristics of the shock absorber are partly determined by various arrangements for transmitting to the cylinder a small axial force applied to the piston rod without opening the throttling passages.

11 Claims, 8 Drawing Figures

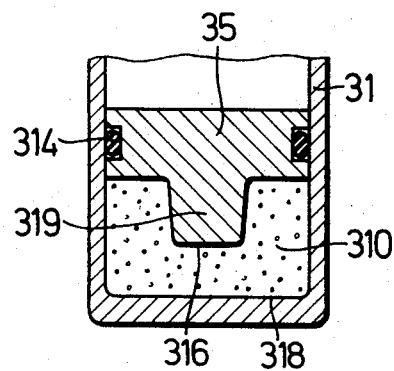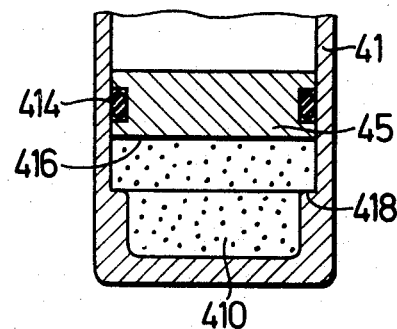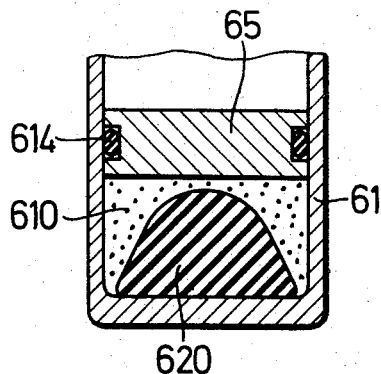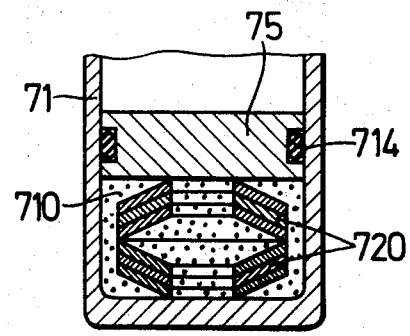

HYDRAULIC SHOCK ABSORBER

This invention relates to shock absorbers, and particularly to hydraulic shock absorbers for use between a bumper and the frame of an automotive vehicle.

Such shock absorbers need to be equipped with a resilient device which restores the original length of the shock absorber after it was shortened by impact of the bumper against an obstacle. The shock absorbers employed heretofore between a bumper and the frame of an automotive vehicle rely for this purpose on metal or rubber springs. The conventional springs greatly add to the bulk, and particularly to the axial length of the known shock absorbers, especially when the force required for restoring the normal length of the shock absorber after impact is relatively high.

It is a primary object of this invention to provide a shock absorber which is of relatively small axial length and simple in its construction.

With this object and others in view, as will presently become apparent, the invention provides a shock absorber for the afore-described application which has a cylinder, a piston axially movable in the cylinder cavity and separating a first compartment and a second compartment of the cavity, and a piston rod fastened to the piston in the cavity and axially extending outward of the cylinder. Fasteners are provided for fastening the piston rod and cylinder to the bumper and frame respectively. A liquid substantially completely fills the compartments, and a throttling device responds to movement of the piston rod inward of the cylinder under a predetermined axial force applied by the fasteners for opening a throttling passage between the compartments. A partition axially movable in the cylinder cavity separates one of the compartments from a chamber in the cavity. A body of gas substantially fills the chamber under a pressure sufficient for biasing the piston rod outward of the cavity in at least most axial positions of the piston rod with a force smaller than the force needed for opening the afore-mentioned throttling passage. An axial force applied to the piston rod in a direction inward of the cylinder cavity, but smaller than the force which would cause opening of the throttling passage, is transmitted to the cylinder.

Other features, additional objects, and many of the attendant advantages of this invention will readily be appreciated as the same becomes better understood from the following detailed description of preferred embodiments when considered in connection with the appended drawing in which:

FIGS. 3 and 4 show modifications of the apparatus of FIG. 2 in fragmentary section on the cylinder axis;

FIGS. 6 and 7 illustrate modifications of the shock absorber of FIG. 5 in the manner of FIGS. 3 and 4.

Figure 1:
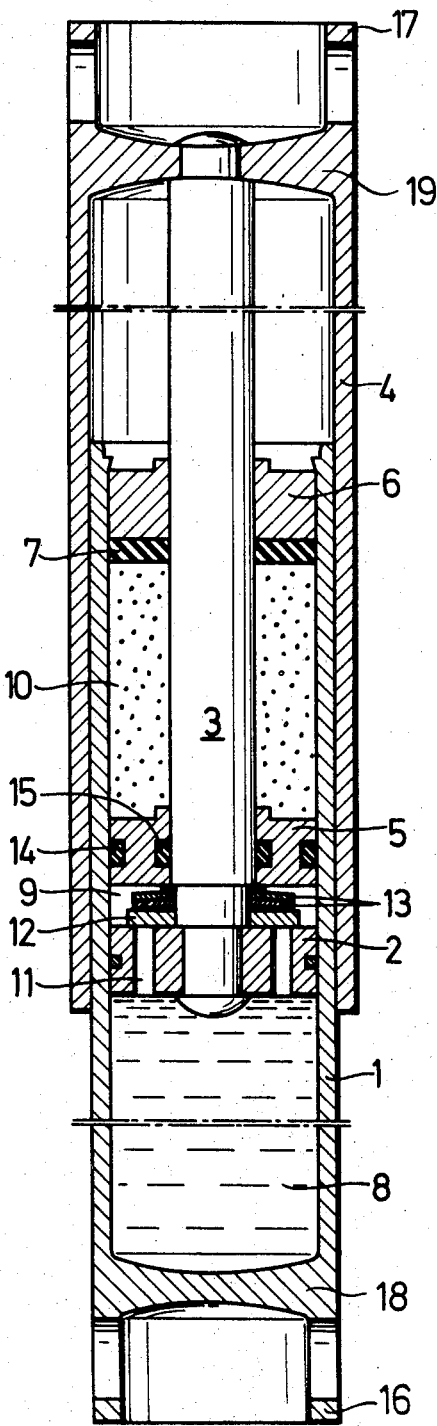
FIG. 1 shows a shock absorber of the invention in section on the axis of its cylinder.

Referring initially to FIG. 1, there is seen a shock absorber having a cylinder 1 whose inner wall is engaged by an axially movable piston 2. A piston rod 3 is fixedly fastened to the piston 2 in the cylinder cavity and extends axially outward of the cylinder 1, its outer end carrying a cup-shaped sleeve 4 which slidingly engages the outer wall of the cylinder 1 and prevents contamination of the shock absorber. The piston rod 3 passes through an annular, axially movable partition 5 in the cylinder cavity and through a central opening in a radial end wall 6 of the cylinder. A rubber disc 7 on the inner face of the end wall 6 prevents the escape of fluid from the cylinder cavity along the piston rod 3.

The piston 2 axially separates a first compartment 8 from a second compartment 9, and the latter is separated by the partition 5 from a chamber 10 in the cylinder cavity. Throttling passages 11 in the piston 2 are normally sealed by an annular valve plate 12 under the pressure of a stack of Belleville washers or cup springs 13. Except for unavoidable, minor leakage, the compartments 8, 9 are completely filled with non-compressible liquid, and the chamber 10 with a gas under a pressure sufficient to bias the piston rod 3 outward of the cylinder cavity in all operating positions of the piston rod, the rod being shown in FIG. 1 at the end of its outward stroke, but the outward force exerted by the gas in the chamber 10 is smaller than the inward force necessary for overcoming the springs 13 and for opening the throttling passages 11. A sealing ring 14 recessed in the partition 5 prevents fluid leakage between the partition and the cylinder 1, and another sealing ring 15 similarly seals the partition 5 to the piston rod 3.

Radially apertured, axial, cylindrical extensions 16, 17 on the imperforate radial end wall 18 of the cylinder 1 and on the sleeve 4 respectively permit the cylinder 1 and the piston rod 3 to be fastened to a bumper and to the frame of an automotive vehicle in a manner known in itself. The stroke of the piston rod 3 inward of the cylinder 1 is limited by abutting engagement of a radial wall 19 of the sleeve 4 against the rim of the cylinder 1 projecting beyond the annular end wall 6.

Upon impact of the non-illustrated bumper against an obstacle, the force exerted on the piston rod 3 in a direction inward of the cylinder cavity is transmitted to the cylinder 1 by the liquid in the first compartment 8 which is axially bounded by the piston 2 and the end wall 18 until the force reaches a value sufficient to overcome the valve closing force of the springs 13. The springs are selected, and the throttling passages 11 are dimensioned in such a manner that the energy of the valve opening force is converted into thermal energy by the internal friction in the liquid flowing through the opened passages 11.

Figure 8:
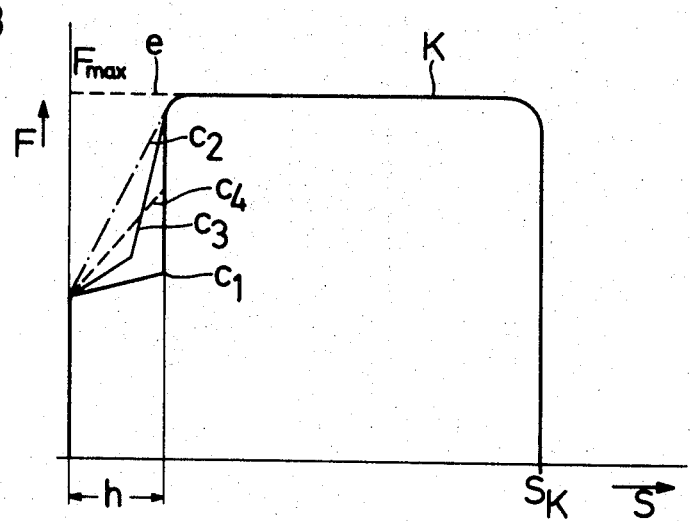
FIG. 8 diagrammatically illustrates the operating characteristics of the several illustrated shock absorbers.

FIg. 8 shows the characteristics of the illustrated shock absorbers of the invention when constructed in such a manner that they have the same, approximately constant relationship of damping force F and piston travel S over the major portion K of the piston stroke which terminates abruptly after piston travel to the limiting value $S_K$.

The several illustrated embodiments differ in their characteristics during the initial phase of operation when the piston and the piston rod travel a distance $h$ not exceeding 40 percent of their total stroke. In the embodiment of FIG. 1, force is initially transmitted from the piston rod 3 to the cylinder 1 by the non-compressible liquid in the first compartment 8 so that the characteristics of the shock absorber are defined from the beginning of piston movement by a broken line $e$ parallel to the abscissa S at the highest value $F_{max}$ of the damping force.

The shock absorber of the invention thus has the highest possible impact absorbing efficiency which is defined by the area bounded by the characteristic curve and the coordinates in the diagram of FIG. 8, and the arrangement of FIG. 1 will be selected where such high efficiency is of paramount importance. It is achieved at the cost of problems in maintaining the sealing rings 14, 15 which must prevent gas leakage not only along the inner cylinder wall, but also along the piston rod 3.

Figure 2:
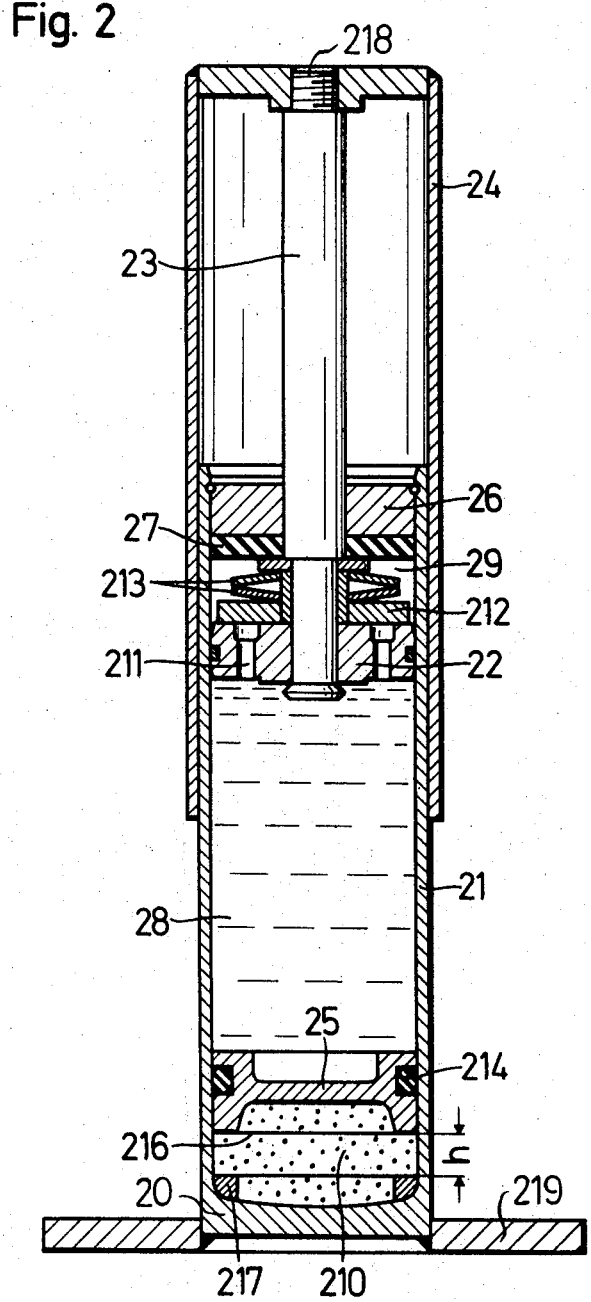
FIG. 2 illustrates another shock absorber of the invention in axially sectional view.

These problems are alleviated or avoided in the shock absorber shown in FIG. 2. Its cylinder 21 is provided with a piston 22, piston rod 23, and protective sleeve 24 substantially as described with reference to FIG. 1, and the liquid-filled compartments 28, 29 on opposite axial sides of the piston 22 may be connected by throttling passages 211 in the piston when a valve plate 212 is lifted from the passages against the restraint of cup springs 213.

The second compartment 29 through which the piston rod 23 passes in axially bounded by the annular, radial end wall 26 or more specifically by the sealing disc 27 on the end wall, whereas the first compartment 28 extends between the piston 22 and a floating or axially movable partition 25 over the full cross section of the cylinder cavity. The gas-filled chamber 210 extends axially between the partition 25 and the imperforate radial end wall 20 of the cylinder 21.

Being remote from the piston rod 23, the partition 25 needs only a relatively large, and thus more effective, sealing ring 214 at its outer circumference. Annular abutments 216, 217 on the partition 25 and the end wall 20 limit the compression of the gas in the chamber 210 when the piston rod 23 is moved inward of the cylinder 21.

A threaded bore 218 in the sleeve 24 and a flange 219 permit the piston rod 23 and the cylinder 21 to be mounted between a bumper and the frame of a vehicle as described above. Upon impact of the bumper against an obstacle, the piston rod 23 is pushed inward of the cylinder 21 from the illustrated outer end position of its stroke, and the force exerted on the rod 23 by the fastening device represented by the bore 218 is transmitted to the cylinder 21 initially by the gas in the chamber 210 which impedes, but does not prevent, piston rod movement, and whose resistance to compression in all positions of the piston rod 23 is smaller than the force required for opening the passages 11. Ultimately, the force transmitting function is assumed by the engaged abutments 216, 217, and the valve plate 212 is lifted from the passages 211. Cavitation occurs in the second compartments 29 until the passages 211 are opened.

The characteristics of the shock absorber of FIG. 2, as far as they differ from that of FIG. 1, are shown in FIG. 8 by the solid line $c_1$. Because of the incompressibility of the liquid in the initially sealed first compartment 28, the piston 22 and the partition 25 jointly move over the distance $h$ which separates the abutments 216, 217 in FIG. 2, the resistance F of the compressed gas to the piston movement rises slowly, and the damping force rises steeply to $F_{max}$ when the passages 211 are opened almost immediately upon engagement of the abutments 216, 217.

As is evident from FIG. 8, the efficiency of the shock absorber illustrated in FIG. 2 is somewhat smaller than that of the first-described embodiment, but the sealing problems inherent in the latter are greatly reduced or eliminated.

Modified abutment arrangements for a shock absorber otherwise identical with that illustrated in FIg. 2 are shown in FIGS. 3 and 4.

In the modification partly illustrated in FIG. 3, the partition 35 is sealed to the cylinder 31 by a resilient ring 314 recessed in the outer circumference of the partition. The gas-filled chamber 310 is axially bounded by the partition 35 and the inner face 318 of the radial, imperforate cylinder end wall. A radial face 316 of a central projection 319 on the partition 35 abuttingly engages the face 318 after inward travel of the piston and piston rod, not themselves shown in FIG. 3, over the distance $h$ so that the characteristics of the shock absorber are the same as illustrated by the line $c_1$ in FIG. 8.

The same mode of operation is achieved in the modified apparatus of FIg. 4 by abutments constituted by the radial face 416 of the partition 45 which bounds the gas-filled chamber 410 and by a shoulder 418 on the inner wall of the cylinder 41, escape of gas from the chamber 410 being prevented by a sealing ring 414 recessed in the outer circumference of the partition 45.

If a relatively high gas pressure at least during a portion of the piston stroke is permissible, abutments may be dispensed with, and the gas cushion compressed until the throttling passages in the piston are opened. SUch an arrangement is shown in FIG. 5 for a shock absorber identical with that seen in FIG. 2 as far as not specifically illustrated.

The cylinder 51 receives a piston 52 to which a piston rod 53 is fixedly fastened in the cylinder cavity. The piston rod is attached to a protective sleeve 54 in a manner not specifically illustrated and passes outward of the cylinder 51 through a liquid-filled compartment 59 and an annular end wall 56 of the cylinder 51 carrying a sealing disc 57. Communication between the compartment 59 and a compartment 58 of the cylinder cavity may be established when throttling passages 511 in the piston 52 are opened by an annular valve plate 512 against the restraint of cup springs 513. An axially movable partition 55 separates the compartment 58 from a chamber 510 which is filled with a gas under a pressure selected to overcome the springs 513 when the damping force $F_{max}$ is reached by compression of the gas. The characteristic curve of the shock absorber of FIG. 5 thus includes the chain-dotted line $c_2$ in FIG. 8.

Figure 5:
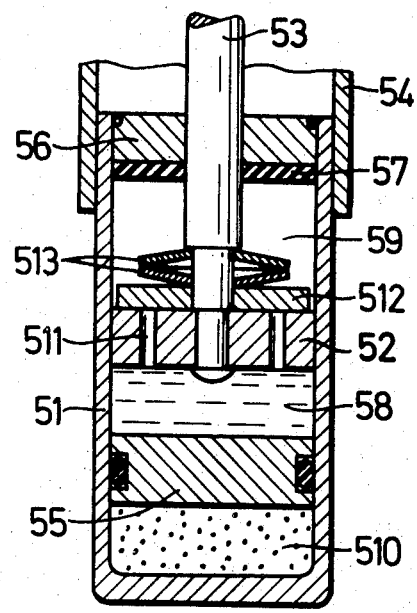
FIG. 5 shows yet another shock absorber of the invention in axial section, portions of the device outside the cylinder being broken away.

The efficiency of the shock absorber illustrated in FIG. 5 is nearest to that of the embodiment shown in FIG. 1, as is evident from FIG. 8, but this advantage is partly offset by the temporary higher internal gas pressure and by the fact that the performance of the apparatus can reach its optimum only at the specific temperature for which it is designed.

Further modifications of the shock absorbers shown in FIGS. 2 and 5 are illustrated in FIGS. 6 and 7, and these shock absorbers are identical with that of FIG. 2 as far as not specifically illustrated. The gas cushion in the apparatus of FIG. 6 is confined in a chamber 610 between an axially movable partition 65 provided with a sealing ring 614 engaging the cylinder 61 and the imperforate radial end wall of the cylinder 61. The end wall carries an elastomeric abutment 620 which projects into the chamber 610 and impedes further compression of the gas in the chamber 610 after limited movement of the partition 65 inward of the chamber 610.

The characteristic curve of the shock absorber of FIG. 6 includes a solid line $c_3$ (FIG. 8) having two, angularly offset, straight portions. The area under the line $c_3$, which is indicative of the shock absorber efficiency, is greater than the area under the line $c_1$ which indicates the operation of the shock absorber of FIG. 2, yet the gas pressure in the chamber 610 can be held relatively low, and the apparatus is not very sensitive to changes in temperature.

A similar mode of operation is achieved in the shock absorber partly illustrated in FIG. 7 by a stack of cup springs 720 arranged in the chamber 710 between the partition 75 and the radial, imperforate, end wall of the cylinder 71. The axial dimension of the stack 720 is chosen in such a manner that the springs abut against the partition 75 and the cylinder wall in the normal, inoperative condition of the shock absorber and transmit the force applied to the piston rod to the end wall of the cylinder 71 until the stack is fully compressed, whereby the piston valve is opened practically instantaneously. The resulting characteristic curve of the shock absorber includes a straight section $c_4$ (broken line in FIG. 8) intermediate in slope between the lines $c_1$ and $c_2$. This arrangement also permits a relatively low gas pressure in the chamber 710 and correspondingly provides less severe operating conditions for the sealing ring 714 on the partition 75.

The total stroke $S_K$ of the piston and piston rod in all illustrated embodiments of the invention is limited in an inward direction by abutment of the protective sleeve against the cylinder, as described above with reference to FIG. 1, and in an outward direction by abutment of elements carried by the piston rod against the inner face of the annular, radial cylinder wall in a manner evident from FIGS. 1 and 2. After inward travel of the piston rod and subsiding of the external forces, the normal condition of the shock absorber is gradually restored by liquid leaking axially between the piston and cylinder under the pressure of the gas cushion.

The dimensional relationships and the gas pressure in the several embodiments are chosen in such a manner that a relatively small axial force applied to the piston rod is transmitted to the cylinder without opening the piston valve while the piston and piston rod travel over not more than 40 percent of their total stroke, and a shorter piston travel or no piston travel at closed piston valve is desirable for better shock absorber efficiency.

It is to be noted that in the embodiment of FIG. 1 the force transmitting medium is constituted by the liquid contained in compartment 8 so that the transmission of force means is completely independent of the body of gas contained in chamber 10 over the entire stroke of the piston rod 3 between its outermost position (as shown) and its innermost position.

In FIG. 2 the force transmitting medium is constituted by the liquid contained in compartment 28 after the movable partition 25 has moved downward from the position as shown by the distance $h$. This means that the force transmission is fully independent of the body of gas over the greater part of the stroke of the piston rod 23, because the partition 25 reaches its deepest possible position (as shown in FIG. 2) after a relatively short part of the stroke of the piston rod 23. The same is true for the embodiments of FIGS. 3, 4, and 6. As far as FIG. 7 is concerned, the force transmission is partially independent of the body of gas over the entire piston stroke because it is also dependent on the stack 720. So it is true for the embodiments of FIGS. 1, 2, 3, 4, 6, and 7 that the force transmitting means is at least particially independent from the body over at least part of the stroke of the piston rod.

What is claimed is:

1. A shock absorber for use between a bumper and the frame of an automotive vehicle comprising:
   a. a cylinder having an axis and bounding a cavity therein;
   b. a piston axially movable in said cylinder and axially separating a first and a second compartment of said cavity;
   c. a piston rod fastened to said piston in said cavity and axially extending outward of said cylinder;
   d. fastening means for respectively fastening said cylinder and said piston rod to said bumper and to said frame respectively;
   e. a liquid substantially completely filling said compartments;
   f. normally closed throttling valve means responsive to movement of said piston rod in a direction inward of said cylinder under a predetermined axial force applied by said fastening means for opening a throttling passage between said compartments;
   g. partition means axially movable in said cylinder and separating one of said compartments from a chamber in said cavity;
   h. a body of gas substantially filling said chamber under a pressure sufficient for biasing said piston rod outward of said cavity in at least one axial position of said piston rod with a force smaller than said predetermined force; and
   i. force transmitting means for transmitting to said cylinder an axial force applied to said piston rod in said inward direction and smaller than said predetermined force.

2. A shock absorber as set forth in claim 1, wherein said cylinder has an imperforate radial end wall axially bounding said cavity and said first compartment, the liquid in said first compartment constituting said force transmitting means, said partition means separating said second compartment from said chamber, and said piston rod extending axially from said piston through said second compartment and said chamber and outward of said cavity.

3. A shock absorber as set forth in claim 1, wherein said cylinder has an imperforate radial end wall axially bounding said cavity and said chamber, said body of gas constituting said force transmitting means, said partition means separating said first compartment from said chamber, and said piston rod extending axially from said piston through said second compartment and outward of said cavity.

4. A shock absorber as set forth in claim 1, wherein said cylinder has an imperforate radial end axially bounding said cavity and said chamber, said partition means separating said first compartment from said chamber, and said force transmitting means include abutment means in said cavity for limiting comprises of said body by relative axial movement of said partition means and of said cylinder.

5. A shock absorber as set forth in claim 4, wherein said abutment means include respective rigid abutments on said partition means and on said cylinder.

6. A shock absorber as set forth in claim 5, wherein said cylinder is formed with a shoulder in said cavity, said shoulder constituting one of said abutments.

7. A shock absorber as set forth in claim 5, wherein one of said abutments is constituted by an axial projection of said partition means axially opposite an abutment face of said cylinder.

8. A shock absorber as set forth in clalim 4, wherein said abutment means include a yieldably resilient abutment.

9. A shock absorber as set forth in claim 8, wherein said abutment is a body of elastomeric material mounted on said end wall.

10. A shock absorber as set forth in claim 8, wherein said abutment includes a stack of cup springs interposed axially between said partition means and said end wall.

11. A shock absorber for use between a bumper and the frame of an automotive vehicle comprising:
 a. a cylinder having an axis and bounding a cavity therein;
 b. a piston axially movable in said cylinder and axially separating a first and a second compartment of said cavity;
 c. a piston rod fastened to said piston in said cavity and axially extending outward of said cylinder;
 d. fastening means for respectively fastening said cylinder and said piston rod to said bumper and to said frame respectively;
 e. a liquid contained in said compartments adjacent said piston;
 f. a throttling passage between said compartments for passage of liquid responsive to movement of said piston rod in a direction inward of said cylinder under a predetermined axial force applied by said fastening means;
 g. a chamber in said cavity;
 h. a body of gas substantially filling said chamber under a pressure sufficient for biasing said piston rod outward of said cavity in at least one axial position of said piston rod with a force smaller than said predetermined force; and
 i. force transmitting means for transmitting to said cylinder an axial force applied to said piston rod in said inward direction, said force transmitting means being at least partially independent of said body of gas over at least part of the stroke of said piston rod between its outermost position and its innermost position.

\* \* \* \* \*